United States Patent

Sauer et al.

[11] Patent Number: 6,011,821
[45] Date of Patent: Jan. 4, 2000

[54] PROCESS FOR SYNCHRONIZATION OF MATCHING CIRCUITS OF A COMMUNICATION SYSTEM WITH SEVERAL MODULES

[75] Inventors: Klaus Sauer, Frankfurt; Hans-Otmar Freitag, Nidderau; Burhan Keles, Darmstadt, all of Germany

[73] Assignee: Robert Bosch GmbH, Stuttgart, Germany

[21] Appl. No.: 08/869,681

[22] Filed: Jun. 5, 1997

[30] Foreign Application Priority Data

Jul. 3, 1996 [DE] Germany ............................ 196 26 675

[51] Int. Cl.$^7$ .............................. H04L 7/00; H04L 23/00; H04J 3/06
[52] U.S. Cl. .......................... 375/356; 375/377; 370/520
[58] Field of Search ...................................... 375/354, 356, 375/365, 368, 373, 376, 377; 370/503, 509, 511, 513, 520

[56] References Cited

U.S. PATENT DOCUMENTS

| | | | |
|---|---|---|---|
| 5,566,180 | 10/1996 | Eidson et al. | 370/94.2 |
| 5,675,588 | 10/1997 | Maruyama et al. | 371/20.4 |
| 5,802,122 | 9/1998 | Niegel | 375/372 |

Primary Examiner—Stephen Chin
Assistant Examiner—Albert Park
Attorney, Agent, or Firm—Michael J. Striker

[57] ABSTRACT

The process of synchronizing matching circuits of a communication system having modules connected with each other by serial data lines includes providing a transmitter and a receiver in each module as an interface between the serial data lines and a matching circuit; synchronizing at least one other matching circuit with a synchronizing matching circuit and transmitting the required synchronizing signals over the serial data lines; supplying parallel signals from the synchronizing matching circuit to the transmitter connected thereto and converting those parallel signals into serial signals in that transmitter; feeding the serial signals over the serial data lines to the receivers connected with the at least one other matching circuit, converting the serial signals into other parallel signals in those receivers and supplying the other parallel signals to the at least one other matching circuit connected with the receivers; generating an error signal in each receiver on detection of a transmission error; and resetting the at least one other matching circuit connected to each receiver producing the error signal when at least two error signals are generated within a predetermined time interval.

5 Claims, 1 Drawing Sheet

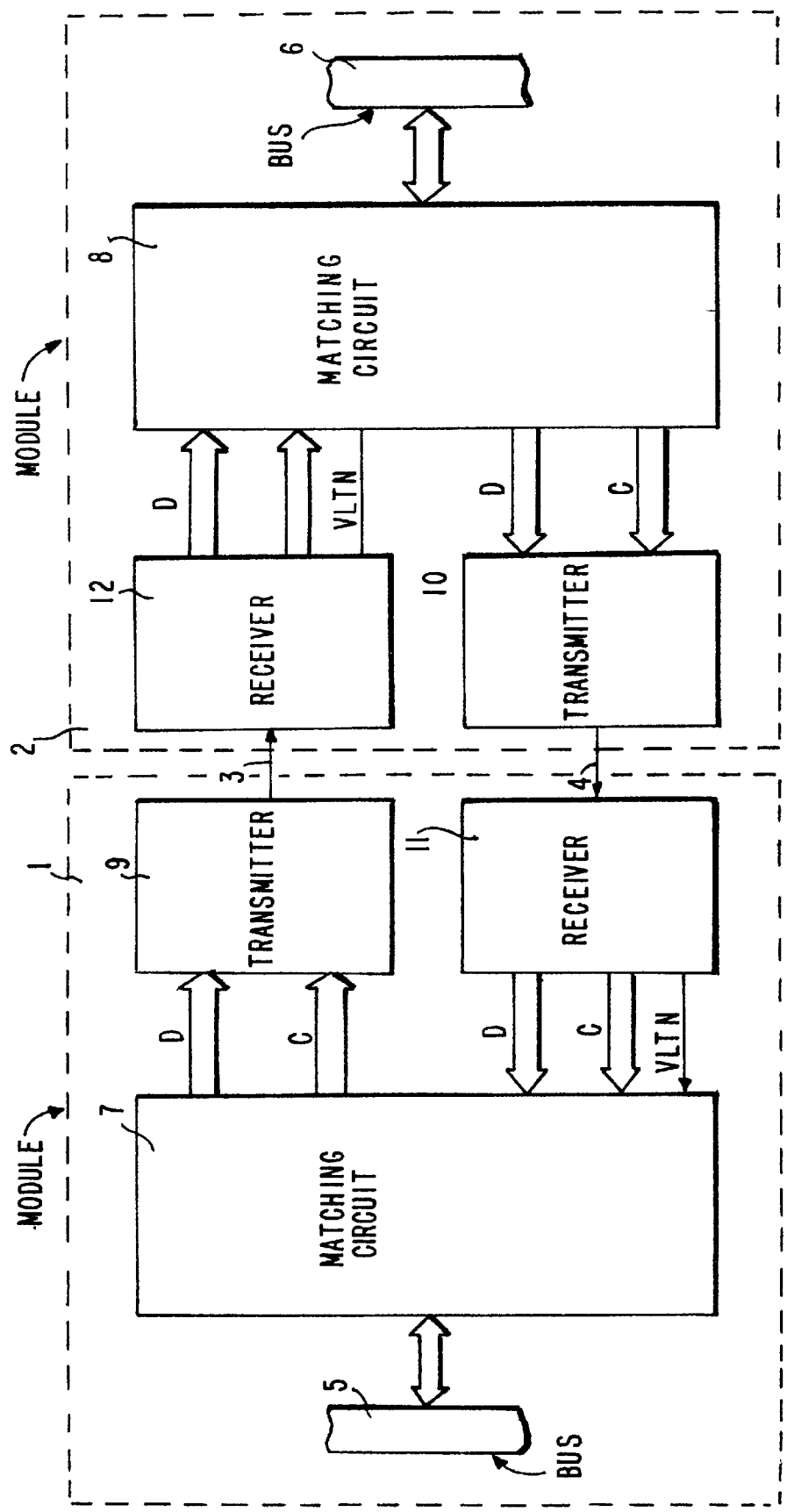

PROCESS FOR SYNCHRONIZATION OF MATCHING CIRCUITS OF A COMMUNICATION SYSTEM WITH SEVERAL MODULES

BACKGROUND OF THE INVENTION

The present invention relates to a process for synchronization of matching circuits of a communication system with several modules, which are connected with each other by serial data lines, including providing a transmitter and a receiver in each module as an interface between the serial data lines and a matching circuit; synchronizing at least one other matching circuit with a synchronizing matching circuit and transmitting the required synchronizing signals over the serial data lines; supplying parallel signals from the synchronizing matching circuit to the transmitter connected thereto and converting those parallel signals into serial signals in that transmitter; feeding the serial signals over the serial data lines to the respective receivers connected with the at least one other matching circuit, converting the serial signals into other parallel signals in those respective receivers and supplying the other parallel signals to the at least one other matching circuit connected with the receivers; and generating an error signal in each receiver on detection of a transmission error.

Interface circuits have been provided for serial transmission of data over light guides or coaxial cables in which the data and additional information (commands) can be fed in parallel to a transmitter and on the receiver side the serial data are converted into parallel signals. When this type of interface circuit is used for transmission of data between different modules of a communication system (communication line), a matching circuit is required between the interface circuit and the respective module, especially a bus required for data transmission inside the module. This type of communication system is, for example, described in German Patent Application P 43 24 201.4.

The data transmission presupposes, among other things, besides a synchronization between the transmitter and receiver a synchronization between the matching circuits of the different modules. If that is not the case, for example, in an initial phase after switching on or after interferences, the interface circuits supply indefinite command signals, which disturb the synchronization of the matching circuits and can lead to an erroneous behavior of the entire communication line.

SUMMARY OF THE INVENTION

It is an object of the present invention to provide a process for synchronization of matching circuits of a communication system with several modules, which is effective in synchronizing the matching circuits after turning on an operating voltage, after shut off and restart of a modules and after reset of another matching circuit.

According to the invention, the process of synchronizing matching circuits of a communication system having modules connected with each other by serial data lines includes providing a matching circuit in each module and a transmitter and a receiver in each module as an interface between the serial data lines and the matching circuit; synchronizing at least one other matching circuit with a synchronizing one of the matching circuits and transmitting the required synchronizing signals over the serial data lines; supplying parallel signals from the synchronizing matching circuit to the transmitter connected thereto and converting those parallel signals into serial signals in that transmitter; feeding the serial signals over the serial data lines to the receiver or receivers connected with the at least one other matching circuit, converting the serial signals into other parallel signals and supplying the other parallel signals to the at least one other matching circuit connected with the receiver or receivers; generating an error signal in each receiver on detection of a transmission error; and resetting the at least one other matching circuit connected to each receiver producing the error signal when at least two error signals are generated within a predetermined time interval.

In preferred embodiments of the invention the predetermined time interval is advantageously about 2 $\mu$s. The synchronized matching circuit advantageously remains reset for about 6 $\mu$s.

The integrated circuits AM 7968 and AM 7969 of Advanced Micro Devices, which are designated by the manufacturer also as Transparent Asynchronous Xmitter-Receiver Interfaces, may be advantageously used as the interface circuits according to our invention.

The interface circuits of this type advantageously generate predetermined data, for example $F_{hex}=1111_{dual}$, on interruption of the serial data lines usually on the receiver side. In order to guarantee a further transmission of error-containing data in case of an interruption and to allow synchronization after the interruption, according to an additional embodiment of the invention the matching circuit is reset further on input of the predetermined data.

In another embodiment of the process according to the invention the matching circuit is also reset when a predetermined number of sequential clock pulses of a frame pulse signal supplied by the receiver are missing.

BRIEF DESCRIPTION OF THE DRAWING

The objects, features and advantages of the invention will now be illustrated in more detail with the aid of the following description of the preferred embodiments, with reference to the accompanying figure which is a block circuit diagram of an apparatus for performing the process according to the invention.

DESCRIPTION OF THE PREFERRED EMBODIMENTS

Two modules 1,2 of a communications systems are connected with each other by two serial data lines 3,4 in the embodiment shown in the drawing. of the modules 1,2 which respectively have at least one coupling field, control devices and connecting circuits for the connecting lines, only the parts necessary for an understanding of the invention are shown, namely the respective busses 5,6 and matching circuits 7,8. The matching circuits 7,8 act as interfaces between the bus systems 5,6, on the one hand, and the transmitters 9,10 and receivers 11,12 of the serial data transmission system, on the other hand, while the transmitters and receivers act as interfaces between the serial data lines 3,4 and the matching circuits 7,8. An exact description of a communications system constructed from modules can be found in the already mentioned German Patent Application P 43 24 201.4.

The transmitters 9, 10 have fourteen respective parallel inputs, of which eight, nine or ten are used for data D and the remainder of the inputs for commands C. For data transmission a synchronization of the receiver and transmitter is required, wherein the concerned modules are synchronized to a synchronizing module (master module). In the master module, for example, in module 1, a frame pulse signal is generated, which is transmitted coded to the synchronized module 2 by means of a command channel of the transmitter 9. The frame pulse signal can be taken from the command output of the receiver 12, whereby an unshown PLL circuit in the matching circuit 8 is synchronized with the frame pulse signal.

A synchronization or resynchronization is required after the following events:

1) turning on the operating voltage,
2) resetting component groups in one of the modules,
3) a shut off and restart of a module,
4) an interruption and reconnection to the transmission path and
5) a shut off of the frame pulse signal.

After the operating voltage is turned on as mentioned under 1) above the receiver 12 generates an error signal VLTN (Violation) at an output provided for that, until it is synchronized to the transmitter 9. Since this does not amount to a meaningful signal transmission, error signals VLTN from the receiver 12 are accumulated during this time. In order to distinguish this situation from a transmission error also occurring in normal operation, a time window of 2 μs duration is started on detection of a first signal. When an additional error signal generated by the receiver 12 during this time window is input into the matching circuit 8, a reset signal is activated which resets the corresponding part of the matching circuit for six seconds. When no second error signal is received within the time window, the time window is again closed.

After each reset in a module after the event indicated by 2 above, the transmitter and receiver of the transmission link must be newly synchronized with each other. Also the receiver 11,12 generates accumulating error signals VLTN, which leads to a reset of the respective matching circuits 7,8.

After putting a module again into operation after its shut off or failure as indicated under number 3) above, the transmitter and receiver of one communications link are similarly newly synchronized with each other. Also frequently error signals VLTN occur, which leads to a rest of the respective matching circuits.

On interruption of the transmission link as indicated under number 4 above, the receiver 11,12 supplies a predetermined value, for example a code "$F_{hex}$" at the output provided for the command signal. The matching circuit 8 detects this value and activates a reset. After connection of the transmission link the receiver again produces an error signal, which again leads to a reset, until error signals are no longer present or only isolated error signals occur.

The frame pulse signals are observed in the matching circuit 8 of the module 2 to be synchronized. After reception of the first frame pulse signal all concerned circuit components or parts are reset. A counter, which is started with the first received frame pulse signal, provides the timing for the next following frame pulse signal so that the synchronization of the transmission line is successful. When however three successive pulses of the frame pulse signal are absent, a synchronization loss is established. Because of that, a reset is activated.

The disclosure in German Patent Application 196 26 675.0 of Jul. 3, 1997 is incorporated here by reference. This German Patent Application, at least in part, describes the invention described hereinabove and claimed in the claims appended herein in below and provides the basis for a claim of priority for the instant invention under 35 U.S.C. 119.

While the invention has been illustrated and described as embodied in a process for synchronization of matching circuits of a communication system with several modules, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for synchronization of matching circuits of a communication system having a plurality of modules connected with each other by serial data lines, said process comprising the steps of:

a) providing a matching circuit in each of the modules and providing a transmitter and a receiver in each of the modules as an interface between said serial data lines and said matching circuit;

b) synchronizing at least one other of said matching circuits with synchronizing signals from one of said matching circuits and transmitting said synchronizing signals required for the synchronizing over the serial data lines;

c) supplying parallel signals from said one of said matching circuits to said transmitter connected therewith and converting said parallel signals supplied therefrom into serial signals in said transmitter;

d) feeding said serial signals over said serial data lines to each of the receivers connected with said at least one other matching circuit, converting said serial signals into other parallel signals in said receivers and supplying the other parallel signals to said at least one other matching circuit connected with said receivers;

e) generating an error signal in each of said receivers on detection of a transmission error; and f) resetting said at least one other matching circuit connected to each of said receivers producing the error signal in step e) when at least two of the error signals are generated within a predetermined time interval.

2. The process as defined in claim 1, wherein said predetermined time interval is about 2 μs.

3. The process as defined in claim 1, wherein said matching circuits which are synchronized remain reset for about 6 μs.

4. The process as defined in claim 1, further comprising generating a predetermined data signal at an output of one of said receivers during an interruption of said serial data lines connected with said output of said one of said receivers and resetting said matching circuit connected with said one of said receivers on receipt of the predetermined data signal in said matching circuit.

5. The process as defined in claim 4, further comprising resetting said matching circuit connected to said one of the receivers when a predetermined number of sequential pulses of a frame pulse signal are fed to said matching circuit via said one of said receivers connected to said matching circuit.

* * * * *